(12) United States Patent
Kawabe

(10) Patent No.: US 12,087,269 B2
(45) Date of Patent: Sep. 10, 2024

(54) SPEECH PROCESSING DEVICE, SPEECH PROCESSING METHOD, AND RECORDING MEDIUM

(71) Applicant: NEC Corporation, Tokyo (JP)

(72) Inventor: Tomoyuki Kawabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 314 days.

(21) Appl. No.: 17/627,948

(22) PCT Filed: Jul. 9, 2020

(86) PCT No.: PCT/JP2020/026903
§ 371 (c)(1),
(2) Date: Jan. 18, 2022

(87) PCT Pub. No.: WO2021/014990
PCT Pub. Date: Jan. 28, 2021

(65) Prior Publication Data
US 2022/0293084 A1      Sep. 15, 2022

(30) Foreign Application Priority Data
Jul. 24, 2019   (JP) .................. 2019-135799

(51) Int. Cl.
*G10L 13/02* (2013.01)
*G10L 17/00* (2013.01)

(52) U.S. Cl.
CPC .............. *G10L 13/02* (2013.01); *G10L 17/00* (2013.01)

(58) Field of Classification Search
CPC ...... G10L 13/02; G10L 17/00; H04M 19/041; H04M 19/04; H04M 1/578; H04M 1/57
See application file for complete search history.

(56) References Cited

U.S. PATENT DOCUMENTS

| 2002/0045438 A1 | 4/2002 | Tagawa et al. |
| 2006/0086308 A1 | 4/2006 | Kindo et al. |
| 2007/0206624 A1 | 9/2007 | Mashima |
| 2008/0234007 A1 | 9/2008 | Lee |
| 2010/0124321 A1* | 5/2010 | Alexandrov ............ H04M 3/56 379/202.01 |
| 2015/0163342 A1* | 6/2015 | Malamud ............. H04M 11/005 455/550.1 |
| 2017/0070615 A1 | 3/2017 | Cartright |

(Continued)

FOREIGN PATENT DOCUMENTS

| CN | 107809541 A | 3/2018 |
| FR | 2880500 A1 | 7/2006 |
| JP | 2001-060993 A | 3/2001 |

(Continued)

OTHER PUBLICATIONS

Extended European Search Report for EP Application No. 20844448.9, dated on Aug. 19, 2022.

(Continued)

*Primary Examiner* — Huyen X Vo

(57) ABSTRACT

A call partner identification means identifies a call partner in order to make it possible for a user to easily identify the call partner by only the sense of hearing. A background sound selection means selects a background sound corresponding to the identified call partner. A synthesis means synthesizes a call speech signal and the selected background sound.

8 Claims, 12 Drawing Sheets

(56) References Cited

U.S. PATENT DOCUMENTS

2019/0394567 A1\* 12/2019 Moore .................. H04R 3/04
2021/0103646 A1    4/2021 Koshinaka et al.

FOREIGN PATENT DOCUMENTS

| | | |
|---|---|---|
| JP | 2005-197827 A | 7/2005 |
| JP | 2005-295196 A | 10/2005 |
| JP | 2007-124679 A | 5/2007 |
| JP | 2012-103845 A | 5/2012 |
| JP | 2013-017027 A | 1/2013 |
| JP | 2019-110450 A | 7/2019 |
| KR | 20060122386 A | 11/2006 |
| WO | 2001/015410 A2 | 3/2001 |
| WO | 2005/002255 A1 | 1/2005 |
| WO | 2005/096530 A1 | 10/2005 |
| WO | 2006/080133 A1 | 8/2006 |
| WO | 2018/198310 A1 | 11/2018 |

OTHER PUBLICATIONS

JP Office Action for JP Application No. 2021-533934, mailed on Sep. 26, 2023 with English Translation.
International Search Report for PCT Application No. PCT/JP2020/026903, mailed on Oct. 6, 2020.
English translation of Written opinion for PCT Application No. PCT/JP2020/026903, mailed on Oct. 6, 2020.
Indian Office Action for IN Application No. 202217003553 mailed on May 10, 2022.

\* cited by examiner

Fig.5

| CALLER ID | SOUND IMAGE LOCALIZATION INFORMATION | BACKGROUND SOUND INFORMATION |
|---|---|---|
| 1 | (x1, y1, z1) | BGM DATA (+PITCH, INTENSITY, AND TONE OF SOUND) |
| 2 | (x2, y2, z2) | |
| ... | ... | ... |

SETTING LIST

SPEECH PROCESSING DEVICE, SPEECH PROCESSING METHOD, AND RECORDING MEDIUM

This application is a National Stage Entry of PCT/JP2020/026903 filed on Jul. 9, 2020, which claims priority from Japanese Patent Application 2019-135799 filed on Jul. 24, 2019, the contents of all of which are incorporated herein by reference, in their entirety.

TECHNICAL FIELD

The disclosure relates to a speech processing device, a speech processing method, and a recording medium, and more particularly, to a speech processing device, a speech processing method, and a recording medium that synthesize a call speech signal with a background sound.

BACKGROUND ART

A related acoustic augmented reality (AR) technique enables a user to talk with a plurality of call partners at the same time. For example, the related technique described in PTL 1 uses a posture information sensor and a right-left independent speaker to define a virtual position at which the user perceives that a speech is heard from a call partner (sound image localization). Accordingly, the user feels as if a virtual space is shared with the plurality of call partners.

PTL 2 describes that utterer information (for example, a name or a nickname of a call partner) heard from a direction designated by the user is output as a speech according to a predetermined operation of the user.

CITATION LIST

Patent Literature

[PTL 1] JP 2013-017027 A
[PTL 2] JP 2012-103845 A
[PTL 3] WO 2018/198310 A

SUMMARY OF INVENTION

Technical Problem

In a case where there is a display, the user can determine who a call partner is by viewing an image of the call partner, a name and a nickname of the call partner displayed on the display. However, in a case where there is no display, the user needs to determine who the call partner is by only the sense of hearing. However, in the related technique described in PTL 1, in a case where the call partner is silent, the user cannot know who the call partner is by the sense of hearing. In the technique described in PTL 2, the user does not notice that there is a silent call partner, and thus there is no motivation to perform a predetermined operation in order to output the utterer information by speech.

The disclosure has been made in view of the above problems, and an object of the disclosure is to provide a speech processing device and the like that enable a user to easily identify a call partner by only the sense of hearing.

Solution to Problem

A speech processing device according to an aspect of the disclosure includes: a call partner identification means configured to identify a call partner; a background sound selection means configured to select a background sound relevant to the identified call partner; and a synthesis means configured to synthesize the selected background sound with a call speech signal.

A speech processing method according to an aspect of the disclosure includes: identifying a call partner; selecting a background sound relevant to the identified call partner; and synthesizing the selected background sound with a call speech signal.

A program stored in a computer-readable recording medium according to an aspect of the disclosure causes a computer to execute: identifying a call partner; selecting a background sound relevant to the identified call partner; and synthesizing the selected background sound with a call speech signal.

Advantageous Effects of Invention

According to an aspect of the disclosure, a user can easily identify a call partner by only the sense of hearing.

BRIEF DESCRIPTION OF DRAWINGS

FIG. 5 is a diagram illustrating an example of a setting list indicating a correspondence relationship among a caller ID for identifying a call partner, sound image localization information, and background sound information.

EXAMPLE EMBODIMENT

First Example Embodiment

A first example embodiment will be described with reference to FIGS. 1 and 2.

In the present first example embodiment, a user uses a calling device to talk with a call partner. The number of call partners may be one or more. The calling device used by the user is hereinafter referred to as a user calling device. The calling device used by the call partner of the user is hereinafter referred to as a call-partner calling device. The calling device is, for example, a mobile terminal, a computer device, or a phone. The calling device is also referred to as a speech device.

A communication network, for example, the Internet or a telephone line, is connected between the call-partner calling device and the user calling device. The user is talking with the call partner by using the user calling device.

(Speech Processing Device 1)

Figure 1:
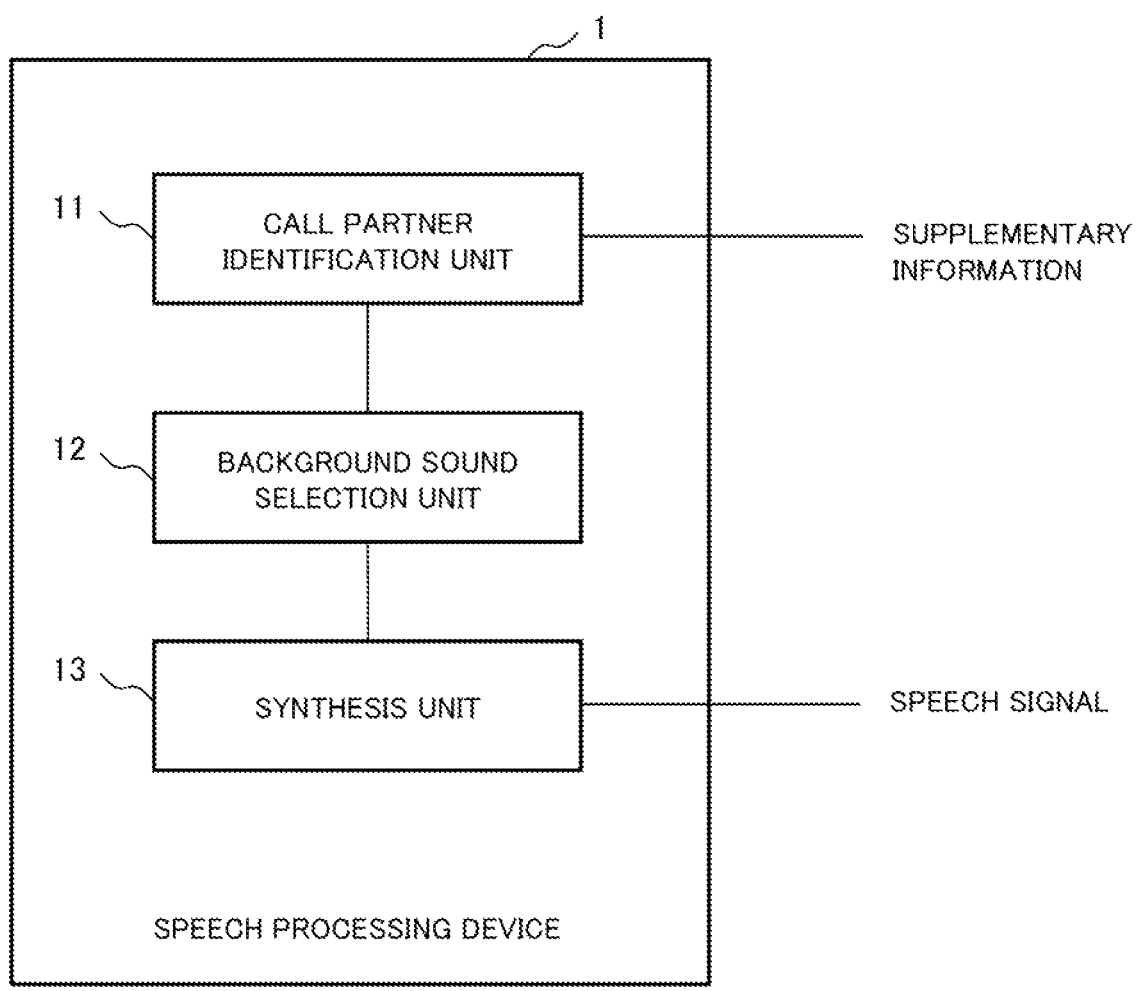
FIG. 1 is a block diagram illustrating a configuration of a speech processing device according to a first example embodiment.

FIG. 1 is a block diagram illustrating a configuration of a speech processing device 1 according to the first example embodiment. As illustrated in FIG. 1, the speech processing device 1 includes a call partner identification unit 11, a background sound selection unit 12, and a synthesis unit 13. The function of each unit of the speech processing device 1 described below may be achieved as software by a processor included in the user calling device (not illustrated) executing a program read into a memory.

The call partner identification unit 11 identifies the call partner. The call partner identification unit 11 is an example of the call partner identification means. Specifically, the call partner identification unit 11 receives supplementary information from a call-partner calling device (not illustrated). The supplementary information includes information for identifying the call-partner calling device.

The supplementary information is, for example, a terminal identification (ID) for identifying the call-partner calling device. Alternatively, the supplementary information may be a telephone number of the call-partner calling device. However, the supplementary information is not limited to the terminal ID and the telephone number. The supplementary information may be information (for example, biometric authentication information) for identifying a call partner.

The call partner identification unit 11 identifies the call partner based on the supplementary information received from the call-partner calling device.

For example, in a case where the supplementary information is the terminal ID of the call-partner calling device, the call partner identification unit 11 refers to data of an owner list stored in a memory (not illustrated). In the data (hereinafter, simply referred to as an owner list) of the owner list, a terminal ID is associated with information on an owner of a calling device.

The call partner identification unit 11 identifies the call partner based on the terminal ID. For example, the call partner identification unit 11 identifies that the owner of the calling device identified by the terminal ID is the call partner with reference to the owner list.

The call partner identification unit 11 transmits information (for example, a caller ID included in the owner list) indicating the identified call partner to the background sound selection unit 12.

The background sound selection unit 12 selects a background sound relevant to the identified call partner. The background sound selection unit 12 is an example of the background sound selection means. For example, the background sound selection unit 12 selects a background sound relevant to the call partner with reference to a caller-background sound table (not illustrated) indicating a correspondence relationship between the caller and the background sound. The caller-background sound table is stored in a memory or a storage.

The background sound is a sound that is heard by the user in such a way as to overlap with a main speech (here, the speech of the call). In general, the background sound has a small volume in such a way as not to disturb the user from listening to the main speech. The background sound is, for example, any of back ground music (BGM), an ambient sound (ambient), and a sound effect. Alternatively, the background sound may be a combination thereof.

For example, the caller-background sound table associates a caller ID for identifying a call partner with information (background sound information) indicating a background sound. The caller-background sound table may be prepared in advance by the user (here, a listener).

Alternatively, the background sound selection unit 12 may select different background sounds for each call partner (here, a speaker) by any method. For example, the background sound selection unit 12 allocates different background sounds to each call partner based on the sensing information acquired as the supplementary information (fourth example embodiment).

The synthesis unit 13 synthesizes a call speech signal and the selected background sound. The synthesis unit 13 is an example of the synthesis means. Specifically, the synthesis unit 13 generates a speech signal (hereinafter, referred to as a speech signal with background sound) obtained by superimposing a background sound on a call speech signal.

Here, in a case where another existing background sound is already superimposed on the call speech signal, the synthesis unit 13 may output the background sound selected by the background sound selection unit 12 together with the another existing background sound. Alternatively, while silencing or reducing the volume of the another existing background sound, the synthesis unit 13 may output the background sound selected by the background sound selection unit 12 at a volume higher than that of the another existing background sound.

The synthesis unit 13 may perform a sound image localization process on the speech signal with background sound in order to allow the user to hear the speech signal with background sound from a virtual place set in advance for each call partner.

Specifically, in the sound image localization process, the synthesis unit 13 adjusts the volume, presence, and the like of the speech signal with background sound. Accordingly, the synthesis unit 13 defines the virtual position of the sound image of the speech signal with background sound. The user who has listened to the speech signal with background sound output from the speaker or the like perceives that there is a sound image of the speech signal with background sound at the virtual position defined by the synthesis unit 13.

The synthesis unit 13 may convert a pitch, an intensity, a tone, or a combination thereof of the background sound according to the group to which the call partner identified by the call partner identification unit 11 belongs. A configuration in which the call partner is classified into a plurality of groups will be described in a third example embodiment.

The synthesis unit 13 outputs the speech signal with background sound generated in this manner.

(Operation of Speech Processing Device 1)

The operation of the speech processing device 1 according to the present first example embodiment will be described with reference to FIG. 2. FIG. 2 is a flowchart illustrating a flow of the process executed by the speech processing device 1.

Figure 2:
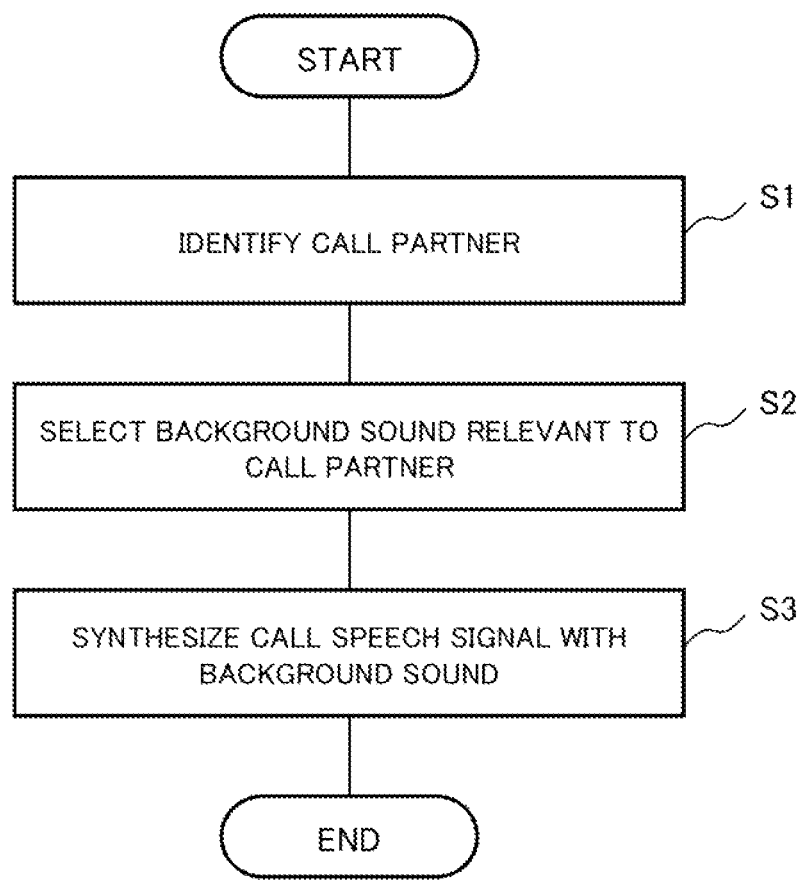
FIG. 2 is a flowchart illustrating an operation of the speech processing device according to the first example embodiment.

As illustrated in FIG. 2, the call partner identification unit 11 identifies the call partner based on the supplementary information received from the call-partner calling device (S1).

The call partner identification unit 11 transmits information (for example, the caller ID) indicating the identified call partner to the background sound selection unit 12.

The background sound selection unit 12 selects a background sound relevant to the call partner based on the information (for example, the caller ID) received from the call partner identification unit 11 (S2).

The background sound selection unit 12 transmits background sound information indicating the selected background sound to the synthesis unit 13. The order of step S1 and step S2 may be reversed or parallel.

The synthesis unit 13 receives the background sound information from the background sound selection unit 12. The synthesis unit 13 receives a call speech signal.

The synthesis unit 13 synthesizes the background sound indicated by the background sound information with the call speech signal (S3). Then, the synthesis unit 13 outputs a speech signal (speech signal with background sound) obtained by synthesizing the background sound with the call speech signal.

Thus, the operation of the speech processing device 1 ends.

(Effects of Present Example Embodiment)

According to the configuration of the present example embodiment, the call partner identification unit 11 identifies the call partner. The background sound selection unit 12 selects a background sound relevant to the identified call partner. The synthesis unit 13 synthesizes a call speech signal and the selected background sound. A speech signal with background sound obtained by synthesizing the call speech signal and the background sound in this manner is output. Therefore, the user can easily identify the call partner by only the sense of hearing.

Second Example Embodiment

A second example embodiment will be described with reference to FIGS. 3 to 7. In the present second example embodiment, a speaker-side calling device and a listener-side calling device will be described.

(Speaker-Side Calling Device 100)

Figure 3:
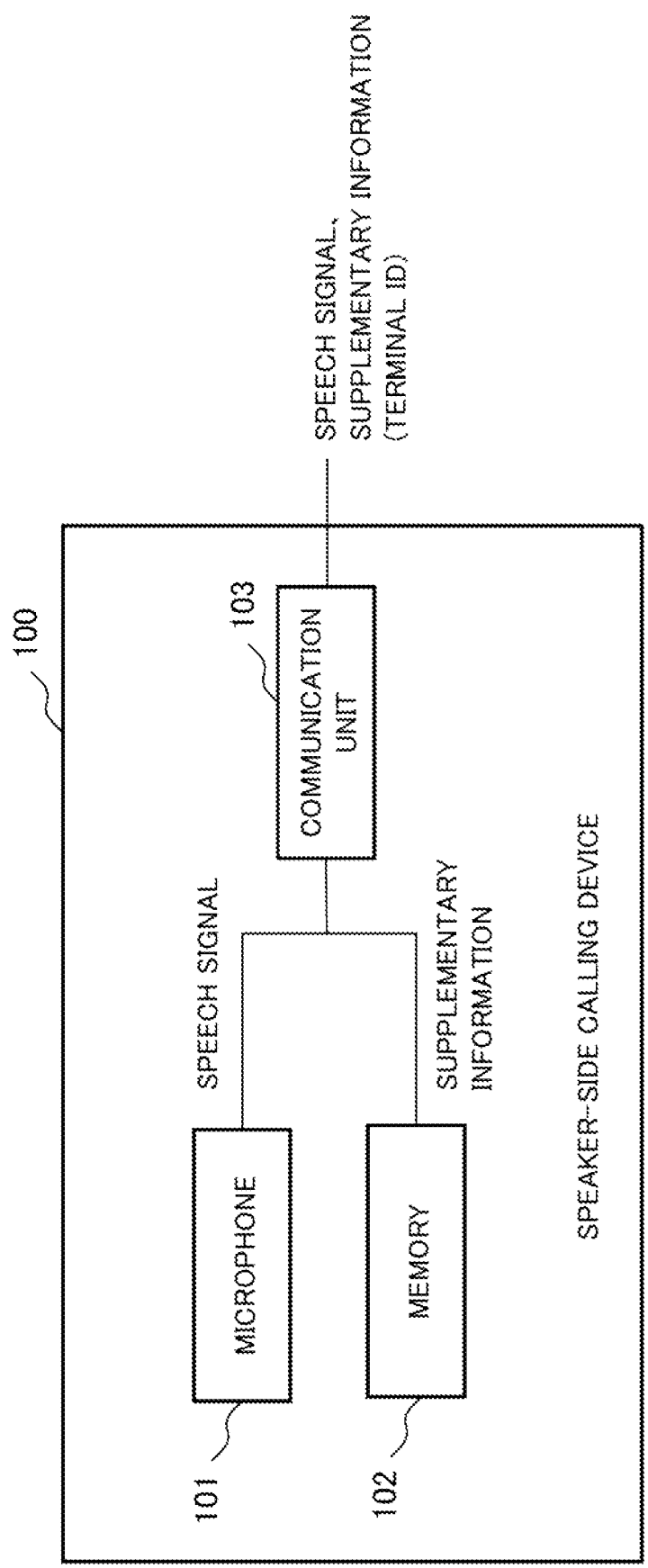
FIG. 3 is a block diagram illustrating a configuration of a speaker-side calling device according to a second example embodiment.

FIG. 3 is a block diagram illustrating a configuration of a speaker-side calling device 100 (hereinafter, simply referred to as a calling device 100). As illustrated in FIG. 3, the calling device 100 includes a microphone 101, a memory 102, and a communication unit 103.

The calling device 100 may further include a sensor or switch for biometrically authenticating an individual speaker. For example, the calling device 100 may acquire, by means of an image sensor (camera), information about a posture of a speaker wearing the calling device 100, or may further include a switch or a sensor for selecting a call partner.

The microphone 101 collects an utterance of the speaker. The microphone 101 converts the utterance of the speaker into a speech signal and transmits the call speech signal to the communication unit 103.

The memory 102 stores at least information indicating the terminal ID for identifying the own device (that is, the calling device 100) and the telephone number of the calling device 100.

The communication unit 103 acquires the information indicating the terminal ID or the telephone number from the memory 102. The communication unit 103 transmits the call speech signal received from the microphone 101 to a listener-side calling device 200, and also transmits the information indicating the terminal ID or the telephone number acquired from the memory 102 as supplementary information to the listener-side calling device 200. In addition, the communication unit 103 may also transmit the sensing information acquired by the calling device 100 as supplementary information to the listener-side calling device 200. For example, the supplementary information is the terminal identification (ID) for identifying the call-partner calling device or the telephone number of the call partner.

(Listener-Side Calling Device 200)

Figure 4:
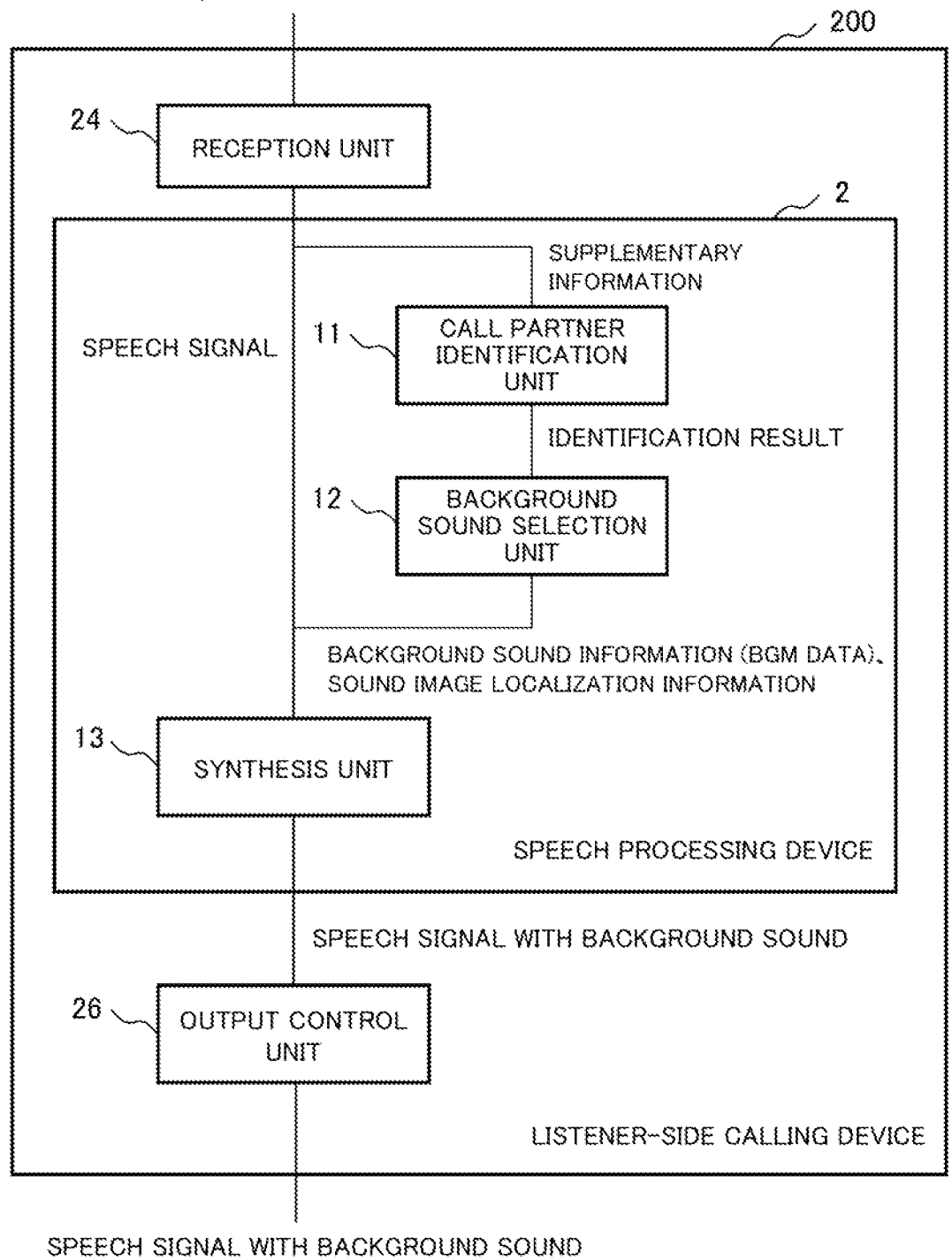
FIG. 4 is a block diagram illustrating a configuration of a listener-side calling device according to the second example embodiment.

FIG. 4 is a block diagram illustrating a configuration of the listener-side calling device 200 (hereinafter, simply referred to as a calling device 200). As illustrated in FIG. 4, the calling device 200 includes a reception unit 24, a speech processing device 2, and an output control unit 26.

As illustrated in FIG. 4, the reception unit 24 receives a speech signal and supplementary information (here, a terminal ID) from the communication unit 103 of the calling device 100. The reception unit 24 transmits the received speech signal to the synthesis unit 13 of the speech processing device 2. The reception unit 24 transmits the received supplementary information to the call partner identification unit 11 of the speech processing device 2.

(Speech Processing Device 2)

As illustrated in FIG. 4, the speech processing device 2 according to the present second example embodiment includes the call partner identification unit 11, the background sound selection unit 12, and the synthesis unit 13. In the first example embodiment, details of the call partner identification unit 11, the background sound selection unit 12, and the synthesis unit 13 have been described. In the present second example embodiment, these units will be briefly described.

The call partner identification unit 11 identifies the call partner. Specifically, the call partner identification unit 11 identifies the call partner based on the supplementary information received from the call-partner calling device.

The call partner identification unit 11 transmits the identification result of the call partner to the background sound selection unit 12. Specifically, the call partner identification unit 11 transmits the caller ID for identifying the call partner to the background sound selection unit 12.

The background sound selection unit 12 selects a sound relevant to the call partner identified by the call partner identification unit 11. Specifically, the background sound selection unit 12 refers to a setting list (see FIG. 5). In a case where the caller ID of the call partner identified by the call partner identification unit 11 is registered in the setting list, the background sound selection unit 12 acquires one piece of back ground music (BGM) data associated with the caller ID of the call partner in the setting list. The BGM is a type of background sound.

On the other hand, even in a case where the call partner identified by the call partner identification unit 11 is not registered in the setting list yet, the background sound selection unit 12 randomly acquires one piece of BGM data not associated with any caller ID registered in the setting list from a BGM library (not illustrated) with reference to the BGM library.

The background sound selection unit 12 acquires sound image localization information associated with the caller ID from the setting list. The sound image localization information is information indicating a coordinate position in a virtual space.

The background sound selection unit 12 transmits the selected BGM data (background sound information) and the sound image localization information to the synthesis unit 13.

The synthesis unit 13 of the calling device 200 receives the BGM data and the sound image localization information from the background sound selection unit 12. Further, the synthesis unit 13 receives a call speech signal from the reception unit 24. The synthesis unit 13 synthesizes a call speech signal and the selected background sound. Specifically, the synthesis unit 13 generates a speech signal with background sound in which the background sound (BGM in this case) is superimposed on the call speech signal.

Here, in a case where another existing background sound is already superimposed on the call speech signal, the synthesis unit 13 may output the BGM selected by the background sound selection unit 12 together with the another existing background sound. Alternatively, while silencing or reducing the volume of the another existing background sound, the synthesis unit 13 may output the BGM selected by the background sound selection unit 12 with a volume higher than that of the another existing background sound.

The synthesis unit 13 may perform the above-described sound image localization process on the speech signal with background sound in order to allow the user to hear the speech signal with background sound from a virtual position set in advance for each call partner.

The synthesis unit 13 transmits the speech signal with background sound to the output control unit 26.

As illustrated in FIG. 4, the output control unit 26 receives the speech signal with background sound from the synthesis unit 13. The output control unit 26 causes a device such as a speaker (not illustrated) to output the received speech signal with background sound. The output control unit 26 may be a component of the speech processing device 2.

(Setting List)

FIG. 5 is a table illustrating an example of the setting list. As illustrated in FIG. 5, the setting list includes the caller ID as supplementary information for identifying a call partner. In the setting list, the sound image localization information and the background sound information are associated with each caller ID.

The sound image localization information indicates a virtual position of a sound image. The background sound information enables the user to identify the call partner from the virtual position of the sound image only by sense of hearing. The background sound information is, for example, data of a BGM, an ambient sound, or a sound effect associated with the caller ID for identifying an individual call partner.

(Operation of Calling Device 200)

Figure 6:
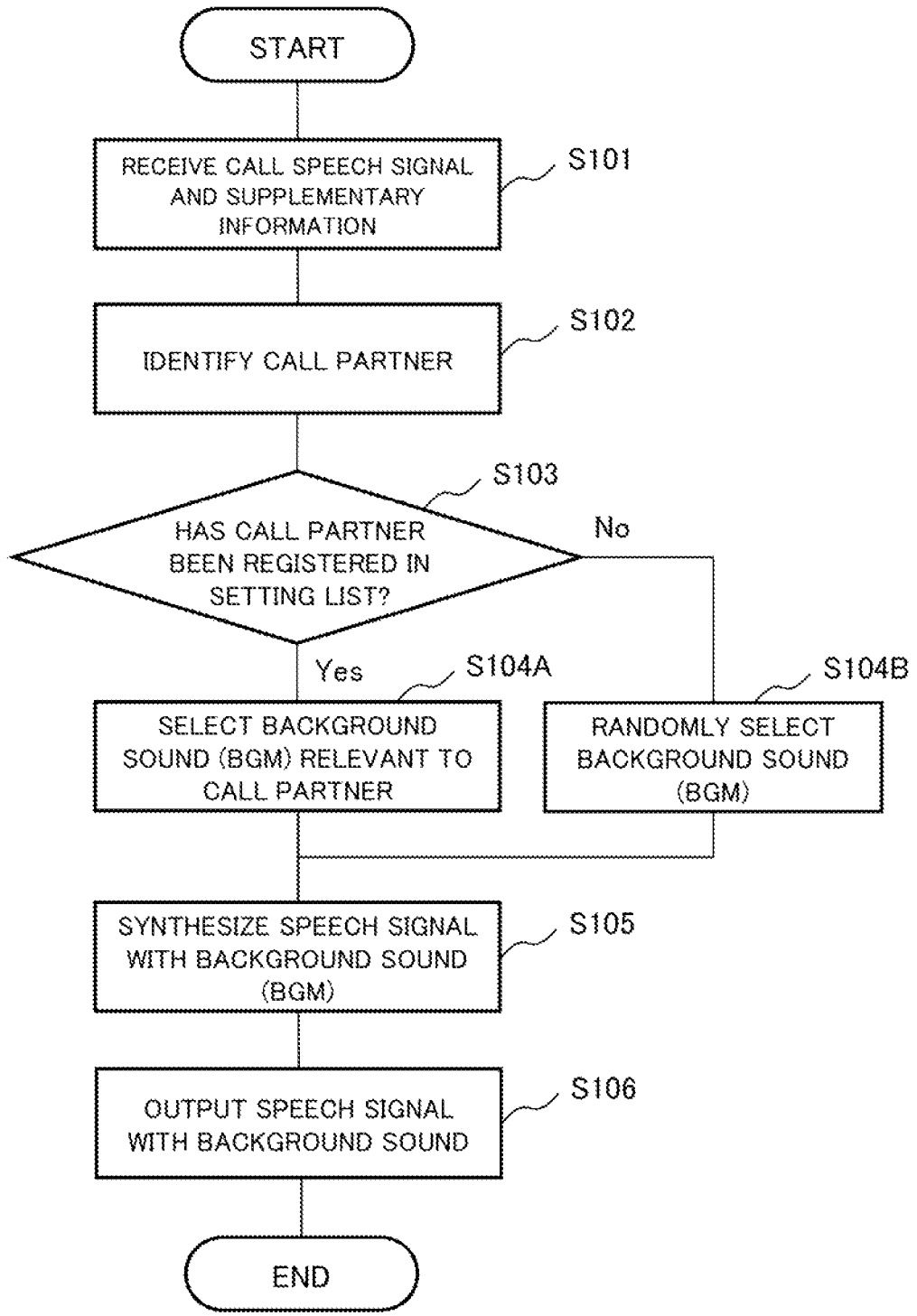
FIG. 6 is a flowchart illustrating a flow of an operation of the listener-side calling device according to the second example embodiment.
Figure 7:
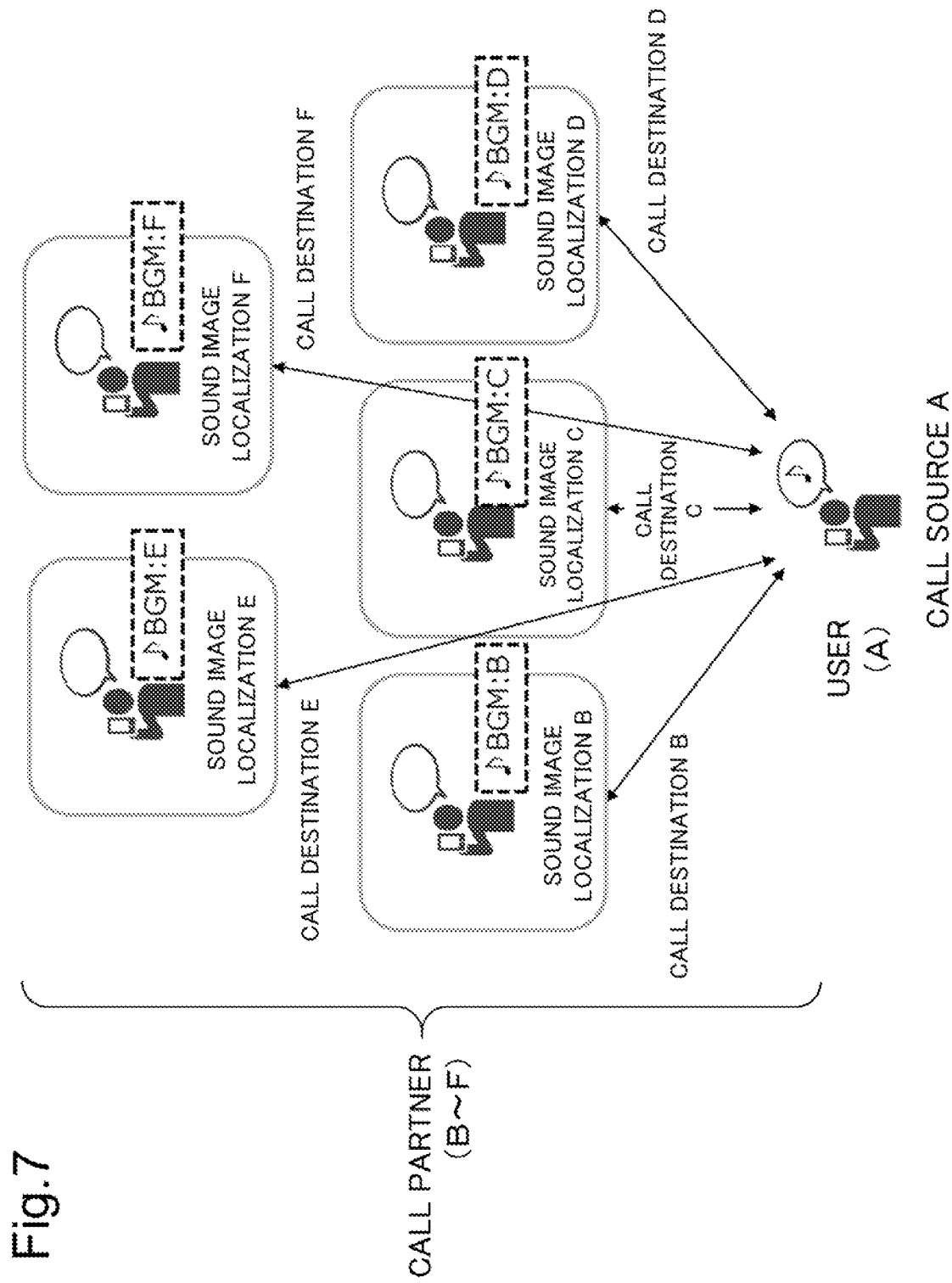
FIG. 7 illustrates a user who is talking with a plurality of call partners.

The operation of the calling device 200 according to the present second example embodiment will be described with reference to FIGS. 6 and 7. FIG. 6 is a flowchart illustrating a flow of the operation of the calling device 200.

As illustrated in FIG. 6, the reception unit 24 of the calling device 200 of the user (A of FIG. 7) receives a call speech signal and supplementary information from the calling device 100 of the call partner (B to F of FIG. 7) (S101).

The reception unit 24 transmits the call speech signal to the synthesis unit 13 of the speech processing device 2, and transmits the supplementary information (here, a terminal ID) to the call partner identification unit 11.

The call partner identification unit 11 receives the supplementary information from the reception unit 24. The call partner identification unit 11 identifies the call partner based on the received supplementary information (S102). The number of call partners is one or more.

The call partner identification unit 11 transmits the identification result of the call partner to the background sound selection unit 12. Specifically, in a case where the identification of the call partner is successful, the call partner identification unit 11 transmits the caller ID for identifying the call partner to the background sound selection unit 12. On the other hand, in a case where the call partner identification unit 11 fails to identify the call partner, the call partner identification unit 11 transmits an empty caller ID (none) to the background sound selection unit 12.

The background sound selection unit 12 receives the identification result of the call partner from the call partner identification unit 11. The background sound selection unit 12 determines whether the call partner has been registered in the setting list (S103). Specifically, the background sound selection unit 12 determines whether the caller ID received from the call partner identification unit 11 is included in the setting list.

In a case where the call partner is registered in the setting list (Yes in S103), the background sound selection unit 12 selects a background sound (BGM in this case) relevant to the call partner (S104A). On the other hand, in a case where the call partner has not been registered in the setting list (No in S103), the background sound selection unit 12 randomly selects a background sound (BGM in this case) not associated with any caller ID registered in the setting list with reference to the BGM library (S104B).

The background sound selection unit 12 transmits the selected BGM data (background sound information) to the synthesis unit 13 together with sound image localization information relevant to the caller ID of the call partner.

The synthesis unit 13 receives the background sound information and the sound image localization information selected according to the call partner from the background sound selection unit 12. The synthesis unit 13 receives the call speech signal from the reception unit 24.

The synthesis unit 13 synthesizes the received call speech signal with the BGM as the background sound (S105). Accordingly, the synthesis unit 13 generates a speech signal with background sound.

The synthesis unit 13 transmits the generated speech signal with background sound to the output control unit 26.

The output control unit 26 receives the speech signal with background sound from the synthesis unit 13. The output control unit 26 outputs the received speech signal with background sound (S106).

Thus, the operation of the calling device 200 ends.

Specific Example

A user (a person indicated by A in FIG. 7) is simultaneously talking with a plurality of call partners (persons indicated by B to F in FIG. 7) using the calling device 200.

As long as a line between the call-partner calling device 100 (FIG. 3) and the user calling device 200 (FIG. 4) is not disconnected, even when a call partner is silent, the user calling device 200 outputs the BGM associated with the caller ID for identifying the call partner as a background sound. Accordingly, the user can intuitively know the presence of the silent call partner by only the sense of hearing.

When the user presses a call end button (not illustrated) on the calling device 200, a telephone line between the calling device 100 and the calling device 200 is disconnected. At this time, the calling device 200 silences (mutes) a BGM relevant to the caller ID for identifying the call partner. Accordingly, the user can intuitively know that the call has ended.

(Modification)

In a modification, each unit of the speech processing device 2 may execute the above-described processing on the network server without using the internal resource of the calling device 200.

(Effects of Present Example Embodiment)

According to the configuration of the present example embodiment, the call partner identification unit 11 identifies the call partner. The background sound selection unit 12 selects a background sound relevant to the identified call partner. The synthesis unit 13 synthesizes a call speech signal and the selected background sound. A speech signal obtained by synthesizing the call speech signal and the background sound in this manner is output. Therefore, the user can easily identify the call partner by only the sense of hearing.

According to the configuration of the present example embodiment, the virtual position for each call partner is defined by the sound image localization information relevant to the call partner. Accordingly, the user can talk with the call partner as if the virtual space is shared.

Third Example Embodiment

In the present third example embodiment, a configuration for identifying a group to which a call partner belongs and performing processing according to the identified group will be described.

(Calling Device 300)

Figure 8:
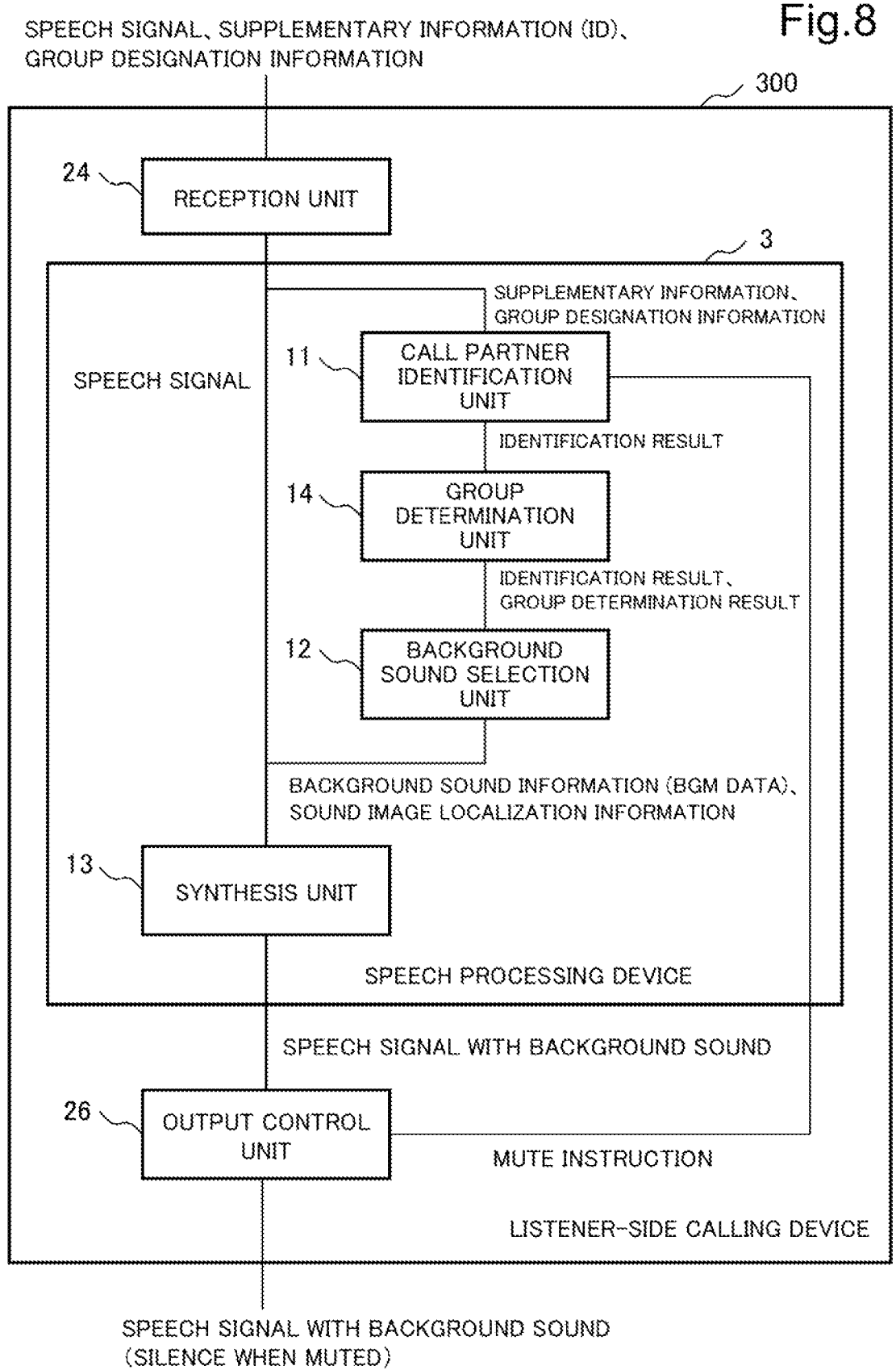
FIG. 8 is a block diagram illustrating a configuration of a listener-side calling device according to a third example embodiment.

FIG. 8 is a block diagram illustrating a configuration of a calling device 300 according to the present third example embodiment. As illustrated in FIG. 8, the calling device 300 includes a speech processing device 3 instead of the speech processing device 2 described in the second example embodiment.

(Speech Processing Device 3)

As illustrated in FIG. 8, the speech processing device 3 according to the present third example embodiment further includes a group determination unit 14 in addition to the call partner identification unit 11, the background sound selection unit 12, and the synthesis unit 13. That is, the speech processing device 3 is different from the speech processing device 2 according to the second example embodiment in that the speech processing device 3 includes the group determination unit 14.

In the second example embodiment, details of the call partner identification unit 11, the background sound selection unit 12, and the synthesis unit 13 have been described. In the present third example embodiment, basic functions of these units are similar to those of the second example embodiment. Therefore, in the present third example embodiment, description of these units is omitted.

The call partner identification unit 11 receives group designation information together with the supplementary information from the reception unit 24. Similarly to the first example embodiment, the call partner identification unit 11 identifies the call partner based on the supplementary information. Further, the call partner identification unit 11 determines whether the user belongs to a designated group based on the group designation information.

In a case where the user does not belong to the designated group, the call partner identification unit 11 instructs the output control unit 26 to silence (mute) the output. In a case where the user belongs to the designated group, the call partner identification unit 11 transmits the identification result of the call partner to the group determination unit 14.

The group determination unit 14 receives the identification result of the call partner from the call partner identification unit 11. The group determination unit 14 determines a group to which the call partner identified by the call partner identification unit 11 belongs. The group determination unit 14 is an example of the group determination means. The group determination unit 14 transmits, to the background sound selection unit 12, the determination result of the group to which the call partner belongs together with the identification result of the call partner.

The background sound selection unit 12 selects a BGM relevant to the group to which the call partner belongs based on the group determination result received from the group determination unit 14. Background sounds (that is, a plurality of BGMs) relevant to a plurality of call partners belonging to the same group preferably have the same feature (for example, the same pitch, the same volume, or the same tone).

(Operation of Calling Device 300)

Figure 9:
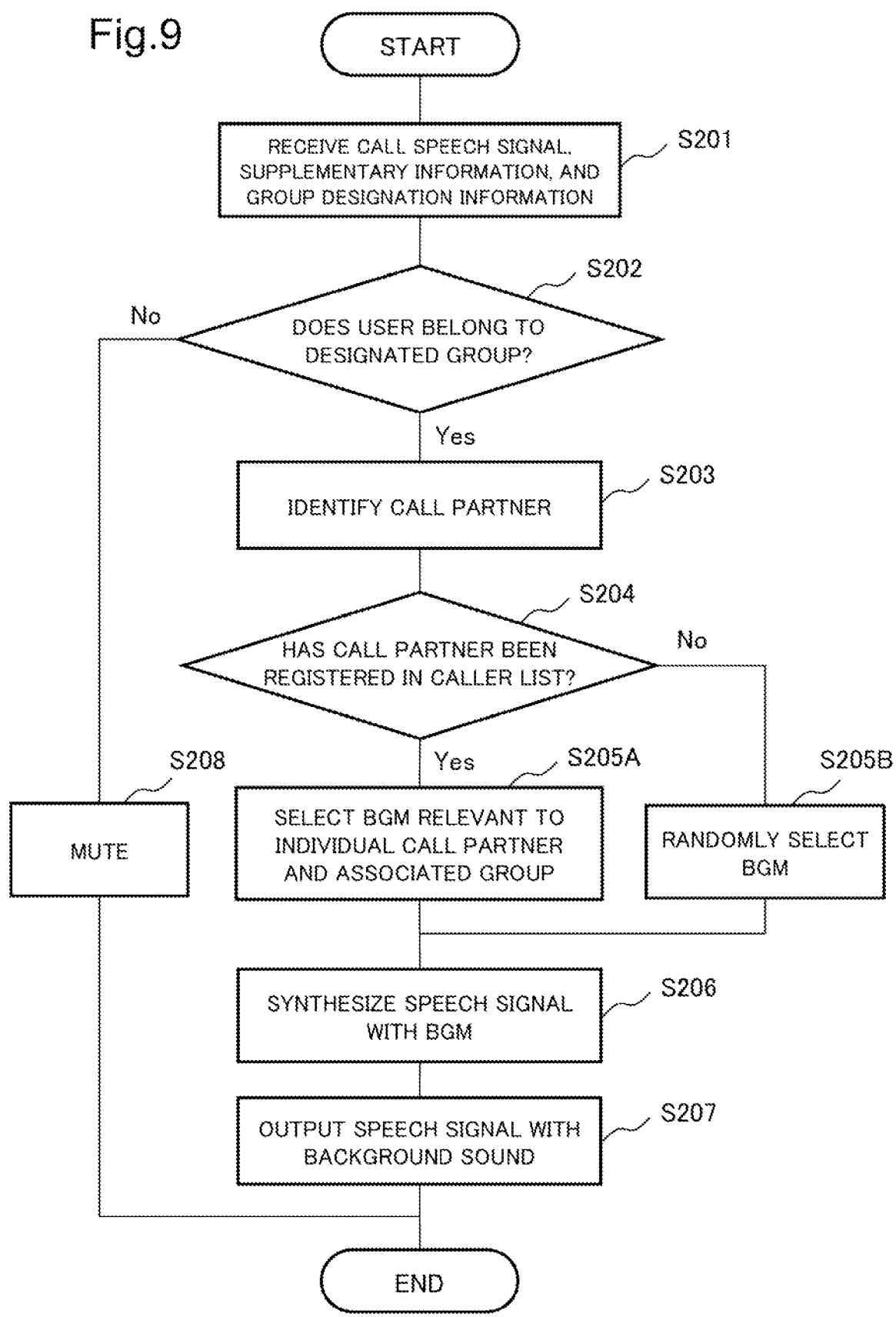
FIG. 9 is a flowchart illustrating a flow of an operation of the listener-side calling device according to the third example embodiment.

The operation of the calling device 300 according to the present third example embodiment will be described with reference to FIGS. 9 to 11. FIG. 9 is a flowchart illustrating a flow of the operation of the calling device 300.

As illustrated in FIG. 9, the reception unit 24 of the calling device 300 of the user (one of B to E of FIG. 10) receives a call speech signal and supplementary information from the calling device 100 of the call partner (A of FIG. 10) (S201).

The reception unit 24 transmits the call speech signal to the synthesis unit 13 of the speech processing device 3, and transmits the supplementary information (for example, a terminal ID or a telephone number) and group designation information to the call partner identification unit 11. The group designation information is information for designating which group of the listener is allowed to listen to the call. The group permitted to listen to the call may be designated by an operation of the call partner (A of FIG. 10) on the calling device 100.

The call partner identification unit 11 receives the supplementary information and the group designation information from the reception unit 24. The call partner identification unit 11 determines whether the user (that is, the owner of the calling device 300) belongs to the designated group based on the received group designation information (S202).

In a case where the user does not belong to the designated group (No in S202), the call partner identification unit 11 instructs the output control unit 26 to silence (mute) the output (S208).

Figure 10:
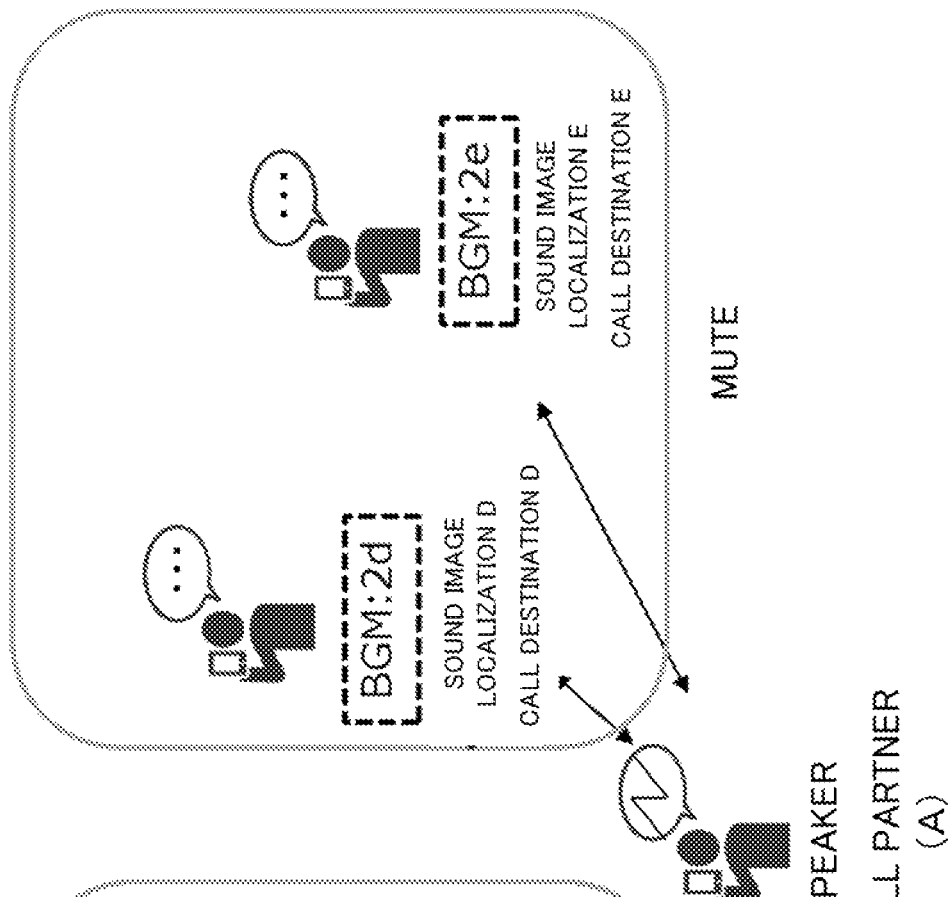
FIG. 10 is a diagram for describing an operation of a calling device in a case where a first group is a designated group, and the designated group talks with a call partner.
Figure 11:
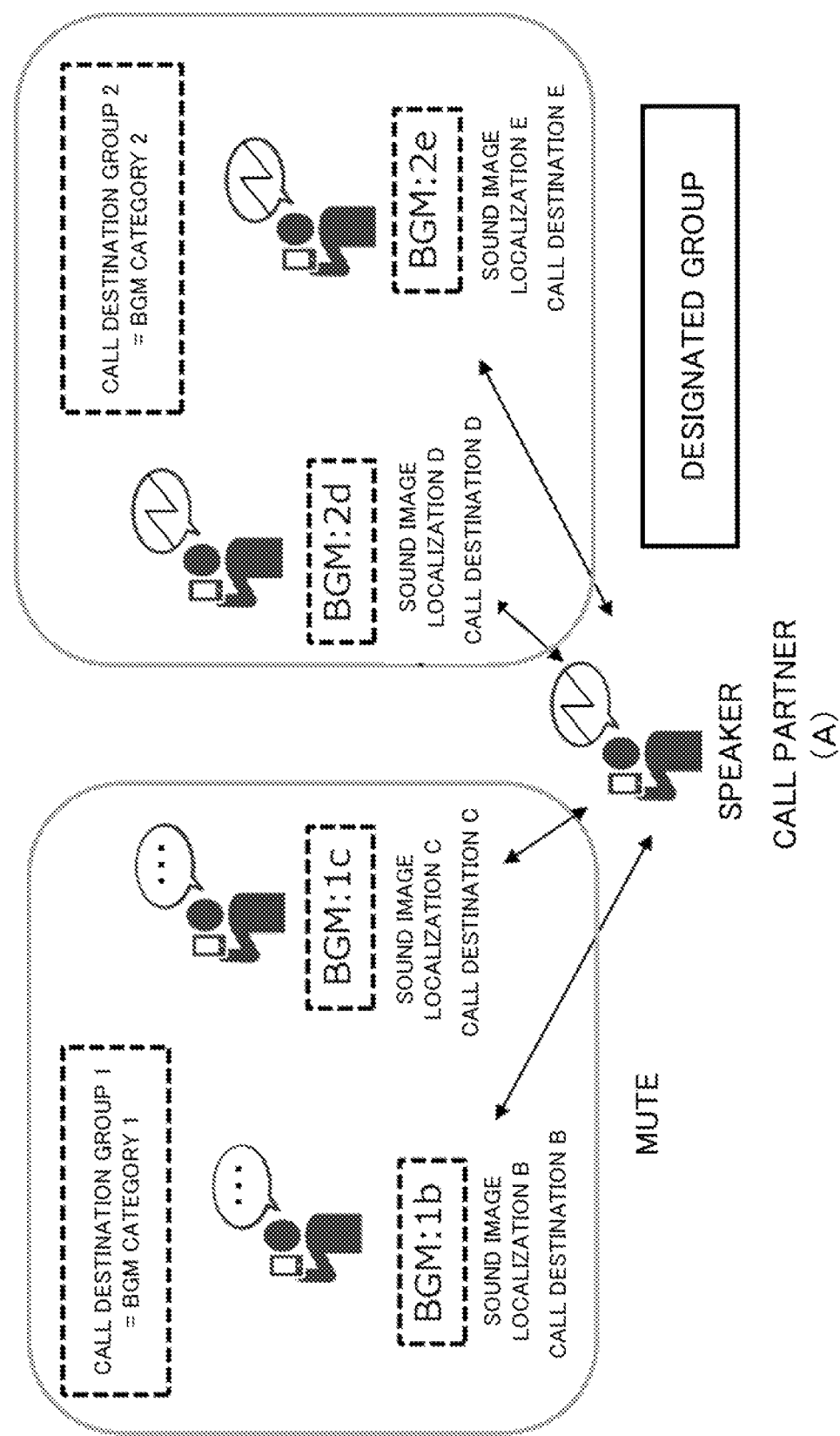
FIG. 11 is a diagram for describing an operation of a calling device in a case where a second group is a designated group, and the designated group talks with the call partner.

In the example illustrated in FIG. 10, in a case where the user belongs to the second group (D or E), the call partner identification unit 11 transmits a mute instruction to the output control unit 26. On the other hand, in the example illustrated in FIG. 11, in a case where the user belongs to the first group (B or C), the call partner identification unit 11 transmits a mute instruction to the output control unit 26.

On the other hand, in case where the user belongs to the designated group (Yes in S202), the call partner identification unit 11 identifies the call partner based on the supplementary information (S203). The call partner identification unit 11 transmits the identification result of the call partner to the group determination unit 14.

In the example illustrated in FIG. 10, in a case where the user belongs to the first group (B or C), the call partner identification unit 11 transmits the identification result of the call partner to the group determination unit 14. On the other hand, in the example illustrated in FIG. 11, in a case where the user belongs to the second group (D or E), the call partner identification unit 11 transmits the identification result of the call partner to the group determination unit 14.

Specifically, in a case where the identification of the call partner is successful, the call partner identification unit 11 transmits a caller ID for identifying the call partner to the group determination unit 14. On the other hand, when the call partner identification unit 11 fails to identify the call partner, the call partner identification unit 11 transmits an empty caller ID (none) to the group determination unit 14.

The group determination unit 14 receives the identification result of the call partner from the call partner identification unit 11. The call partner identification unit 11 determines a group to which the call partner identified by the call partner identification unit 11 belongs. The group determination unit 14 is an example of the group determination means. The group determination unit 14 transmits, to the background sound selection unit 12, the determination result of the group to which the call partner belongs together with the identification result of the call partner.

The background sound selection unit 12 receives, from the group determination unit 14, the identification result of the call partner and the determination result of the group to which the call partner belongs. The background sound selection unit 12 determines whether the call partner has been registered in the setting list (S204). Specifically, the background sound selection unit 12 determines whether the caller ID received as the identification result of the call partner from the call partner identification unit 11 is included in the setting list.

In a case where the call partner is registered in the setting list (Yes in S204), the background sound selection unit 12 selects a background sound (BGM in this case) relevant to the call partner (and the group to which the call partner belongs) (S205A). On the other hand, in a case where the call partner has not been registered in the setting list (No in S204), the background sound selection unit 12 randomly selects a background sound (BGM in this case) with reference to the BGM library (S205B).

The background sound selection unit 12 transmits the selected BGM data (background sound information) to the synthesis unit 13 together with sound image localization information relevant to the caller ID of the call partner.

The synthesis unit 13 receives the background sound information selected according to the call partner from the background sound selection unit 12. The synthesis unit 13 receives the call speech signal from the reception unit 24.

The synthesis unit 13 synthesizes the received call speech signal with the BGM as the background sound (S206). Accordingly, the synthesis unit 13 generates a speech signal with background sound.

The synthesis unit 13 transmits the generated speech signal with background sound to the output control unit 26.

The output control unit 26 receives the speech signal with background sound from the synthesis unit 13. The output control unit 26 outputs the received speech signal with background sound from a speaker (not illustrated) or the like (S207).

Thus, the operation of the calling device 300 ends.

(Effects of Present Example Embodiment)

According to the configuration of the present example embodiment, the call partner identification unit 11 identifies the call partner. The background sound selection unit 12 selects a background sound relevant to the identified call partner. The synthesis unit 13 synthesizes a call speech signal and the selected background sound. A speech signal obtained by synthesizing the call speech signal and the background sound in this manner is output. Therefore, the user can easily identify the call partner by only the sense of hearing.

According to the configuration of the present example embodiment, the group determination unit 14 determines a group to which the call partner belongs. The background sound selection unit 12 preferably selects a BGM relevant to the group to which the call partner belongs as the background sound.

Accordingly, the user can easily identify the group to which the call partner belongs by the feature (for example, the pitch, intensity, and tone of the sound) of the BGM.

Fourth Example Embodiment

In the present fourth example embodiment, the speaker-side calling device (the calling device 100 described in the first example embodiment) is a hearable device worn on the ear. The hearable device is a type of wearable device to which an otoacoustic authentication technique is applied. An example of the hearable device is described in PTL 3.

In the present fourth example embodiment, the calling device 100 includes a speaker which emits a sound signal (inspection signal) toward the inside of the ear of the speaker and a microphone which receives an echo signal from the inside of the ear. The calling device 100 transmits the echo signal received by the microphone as sensing information to the listener-side calling device (the calling devices 200 and 300 described in the second and third example embodiments).

In the present fourth example embodiment, the call partner identification unit 11 of the calling devices 200 and 300 identifies the call partner based on the sensing information from the calling device 100. Specifically, the call partner identification unit 11 uses a characteristic echo (acoustic characteristics) determined by the shape of the ear hole of the speaker as the sensing information. The background sound selection unit 12 selects a BGM on the basis of the identification result of the call partner based on the sensing information. The shape of the ear hole is, for example, a shape from an ear canal to an eardrum or a shape extending to a middle ear or an inner ear.

(Modification)

In a modification, the calling device 100 is a wearable device other than the hearable device. For example, the calling device 100 according to the present modification is a glass (glasses) type or wristband type wearable device.

(Effects of Present Example Embodiment)

According to the configuration of the present example embodiment, the call partner identification unit 11 identifies the call partner. The background sound selection unit 12 selects a background sound relevant to the identified call partner. The synthesis unit 13 synthesizes a call speech signal and the selected background sound. A speech signal obtained by synthesizing the call speech signal and the background sound in this manner is output. Therefore, the user can easily identify the call partner by only the sense of hearing.

According to the configuration of the present example embodiment, the speaker-side calling device is a wearable device such as a hearable device. Therefore, the listener-side calling device can identify the call partner (speaker) based on the sensing information acquired from the body of the speaker, and select the background sound relevant to the identified call partner.

Fifth Example Embodiment

The fifth example embodiment will be described below with reference to FIG. 12.

(Regarding Hardware Configuration)

Each component of the speech processing device described in the first to fourth example embodiments indicates a block of a functional unit. Some or all of these components are achieved by an information processing device 900 as illustrated in FIG. 12, for example. FIG. 12 is a block diagram illustrating an example of a hardware configuration of the information processing device 900.

Figure 12:
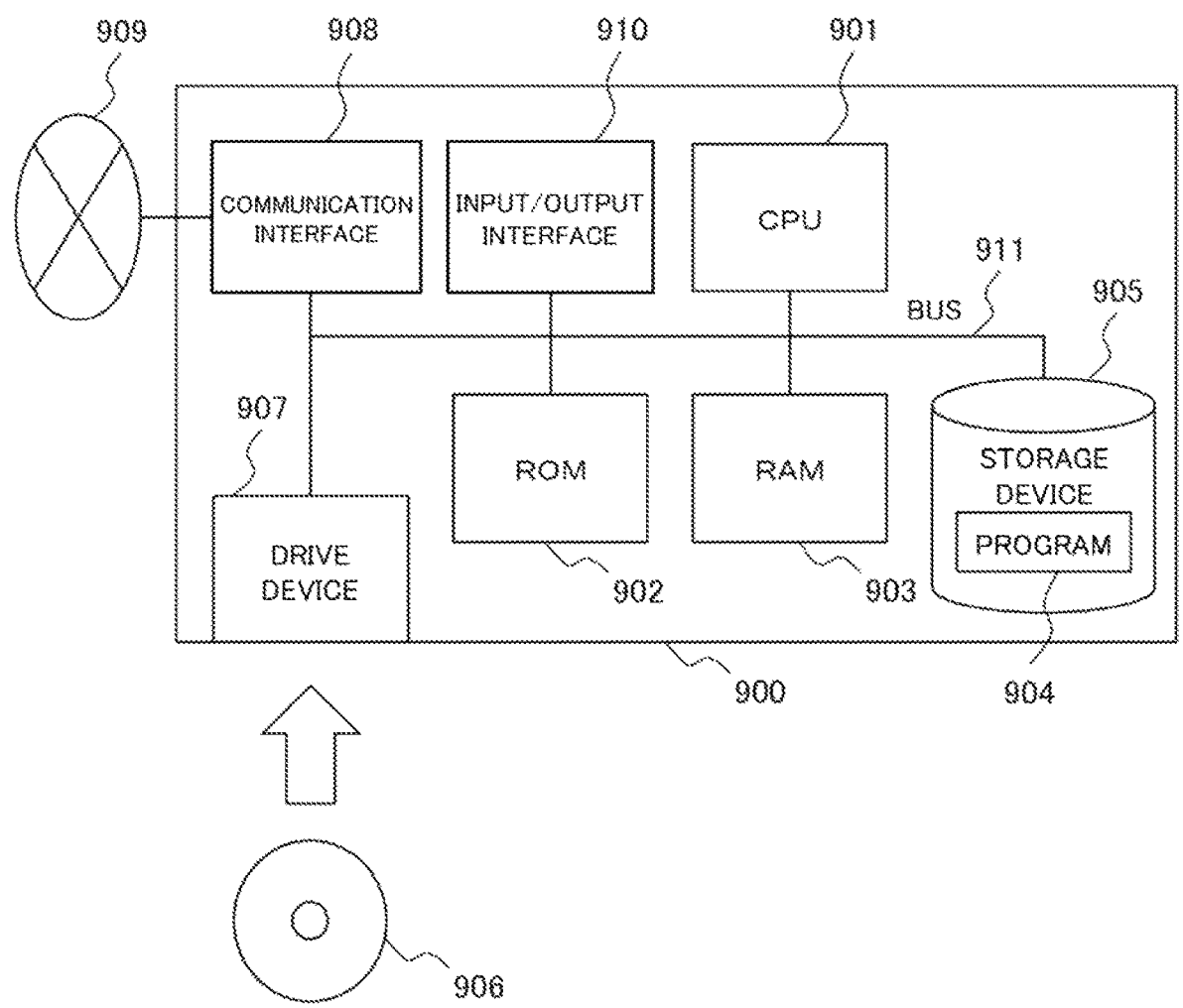
FIG. 12 is a diagram illustrating a hardware configuration of an information processing device according to a fifth example embodiment.

As illustrated in FIG. 12, the information processing device 900 includes the following configuration as an example.

CPU (Central Processing Unit) 901
ROM (Read Only Memory) 902
RAM (Random Access Memory) 903
Program 904 loaded into RAM 903
Storage device 905 storing program 904
Drive device 907 which reads and writes recording medium 906
Communication interface 908 connected with communication network 909
Input/output interface 910 for inputting/outputting data
Bus 911 connecting each component Each component of the speech processing device described in the first to fourth example embodiments is achieved by the CPU 901 reading and executing a program 904 for achieving these functions. The program 904 for achieving the function of each component is stored in the storage device 905 or the ROM 902 in advance, for example, and the CPU 901 loads the program 904 into the RAM 903 and executes the program 904 as necessary. The program 904 may be supplied to the CPU 901 via the communication network 909, or may be stored in advance in the recording medium 906, and the drive device 907 may read the program and supply the program 904 to the CPU 901.

(Effects of Present Example Embodiment)

According to the configuration of the present example embodiment, the speech processing device described in the example embodiment is achieved as hardware. Therefore, effects similar to the effects described in the example embodiment can be obtained.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the disclosure as defined by the claims.

This application is based upon and claims the benefit of priority from Japanese patent application No. 2019-135799, filed on Jul. 24, 2019, the disclosure of which is incorporated herein in its entirety by reference.

INDUSTRIAL APPLICABILITY

The disclosure can be applied to, for example, a portable game machine and a virtual realty (VR) device.

REFERENCE SIGNS LIST 1 speech processing device
11 call partner identification unit
12 background sound selection unit
13 synthesis unit
14 group determination unit
24 reception unit
26 output control unit
100 speaker-side calling device
200 listener-side calling device
300 listener-side calling device

What is claimed is:

1. A speech processing device comprising:
at least one memory configured to store instructions; and
at least one processor configured to execute the instructions to:
identify a call partner;
select a background sound relevant to the identified call partner; and
synthesize the selected background sound with a call speech signal,
wherein the at least one processor is configured to execute the instructions to:
obtain an echo signal characteristic of a shape of an ear hole of the call partner from a hearable device worn by the call partner and identify the call partner based on the obtained echo signal.

2. The speech processing device according to claim 1, wherein the at least one processor is configured to execute the instructions to:
receiving group designation information for designating a group to which a listener to be allowed to listen to a call belongs, and silences an output of an output control means configured to output a speech signal based on the received group designation information.

3. The speech processing device according to claim 1, wherein:
the at least one processor is further configured to execute the instructions to:
determine a group to which the identified call partner belongs, wherein select the background sound according to a determination result of the group to which the call partner belongs.

4. The speech processing device according to claim 1, wherein the at least one processor is configured to execute the instructions to:
define a virtual position of localizing a sound image of the call speech signal according to the identified call partner.

5. The speech processing device according to claim 1, wherein the background sound is any of a back ground music (BGM), an ambient sound, and a sound effect.

6. The speech processing device according to claim 1, wherein the call partner identification means identifies the call partner based on sensing information acquired from a body of the call partner.

7. A speech processing method comprising:
identifying a call partner;
selecting a background sound relevant to the identified call partner; and
synthesizing the selected background sound with a call speech signal,
wherein the speech processing method comprises:
obtaining an echo signal characteristic of a shape of an ear hole of the call partner from a hearable device worn by the call partner and identifying the call partner based on the obtained echo signal.

8. A non-transitory computer-readable recording medium storing a program for causing a computer to execute:
identifying a call partner;
selecting a background sound relevant to the identified call partner; and
synthesizing the selected background sound with a call speech signal,
wherein the program causes the computer to execute:
obtaining an echo signal characteristic of a shape of an ear hole of the call partner from a hearable device worn by the call partner and identifying the call partner based on the obtained echo signal.

* * * * *